United States Patent [19]
Moriya

[11] Patent Number: 6,061,409
[45] Date of Patent: May 9, 2000

[54] SYNCHRONIZATION RECOVERY FOR A MOBILE TELEPHONE

[75] Inventor: Masahiro Moriya, Shrewsbury Township, N.J.

[73] Assignee: Matsushita Electric Industrial Co., Ltd., Osaka, Japan

[21] Appl. No.: 08/670,496

[22] Filed: Jun. 27, 1996

[51] Int. Cl.⁷ ................ H04L 7/00; H04J 3/06; G06F 11/00
[52] U.S. Cl. ............. 375/357; 370/503; 395/182.1
[58] Field of Search .................. 375/357, 354, 375/260, 356, 367; 370/503, 507, 220, 216, 504, 509, 512; 395/182.1; 455/265, 502

[56] References Cited

U.S. PATENT DOCUMENTS

| | | | |
|---|---|---|---|
| 3,920,921 | 11/1975 | Pitroda et al. | 370/216 |
| 4,837,850 | 6/1989 | Maisel et al. | 375/356 |
| 5,280,541 | 1/1994 | Marko et al. | 455/502 |
| 5,384,828 | 1/1995 | Brown et al. | 455/465 |

*Primary Examiner*—Stephen Chin
*Assistant Examiner*—Albert Park
*Attorney, Agent, or Firm*—Amster, Rothstein & Ebenstein

[57] ABSTRACT

A system is disclosed for permitting a mobile telephone to recover an ongoing communication following a temporary interruption of operation, e.g., such as caused by an interruption of power to the mobile telephone, which includes circuitry and processor control to calculate the duration of the temporary interruption and for restoring synchronization of the mobile telephone to the mobile communication system. The circuitry stores synchronizing information prior to the temporary interruption and cycles synchronizing circuitry of the mobile telephone at a higher than normal cycling rate to restore synchronization of the mobile telephone with the mobile communication system. In a further embodiment, circuitry is disclosed for restoring the output of spread code generating circuitry in a spread spectrum digital mobile telephone to a phase used by a transmitting station of the mobile communication system. In another embodiment of the disclosed invention, circuitry is disclosed for restoring the output of a time slot generator in a spread spectrum digital mobile telephone to synchronization with a time slot pattern used by a transmitting station of the mobile communication system.

26 Claims, 4 Drawing Sheets

SYNCHRONIZATION RECOVERY FOR A MOBILE TELEPHONE

The present invention relates to a mobile telephone, and more specifically to a mobile telephone system and method which maintains synchronized operation with a cellular or other mobile communication system.

BACKGROUND OF THE INVENTION

The demand for terrestrial communications has increased markedly in recent years. To meet the increasing demand, digital cellular mobile communications systems have been implemented which have increased channel capacity.

Among many available digital mobile communications systems, one which has been implemented widely uses a set of modulation and transmission principles known as spread spectrum transmission. A standard for spread spectrum transmission has been adopted in North America which is known as the Code Division Multiple Access Standard ("the CDMA Standard"). The CDMA Standard defines a direct spread system whereby communication data is modulated by multiplication with a pseudo-random spread code at baseband, then shifted to a transmission frequency which is shared by other transmitters which transmit at different phases, i.e., entry points, of the same spread code. According to the CDMA Standard, mobile telephones demodulate spread spectrum modulated transmissions by multiplying the detected spread spectrum transmission with the pseudo-random spread code at the same phase which was used to modulate the signal. The spread code in CDMA Standard communication systems is a periodically repeating sequence of bits approximately 32 kilobits in length. In existing CDMA Standard systems, each base station transmitter is assigned to modulate outgoing communications for transmission at a particular, distinguishable phase, i.e., entry point of a universally used spread code.

A mobile telephone which operates in accordance with the CDMA Standard demodulates transmissions by maintaining the phase of a locally generated spread code in synchronization with the phase of a spread code used by a base station with which it is in communication. However, existing digital mobile telephones, while capable of maintaining synchronization during normal operation, are subject to communication interruptions when the voltage of the main power source of the mobile telephone falls below operational levels. In such case, even when the main power source voltage is quickly restored again to operational levels, communications which are in progress cannot be resumed because the spread code phase of the received transmission cannot be recovered. A mobile telephone system is disclosed herein which provides for recovery of communications following a temporary interruption of operation such as caused by failure of a main power source voltage of the mobile telephone.

Figure 1:
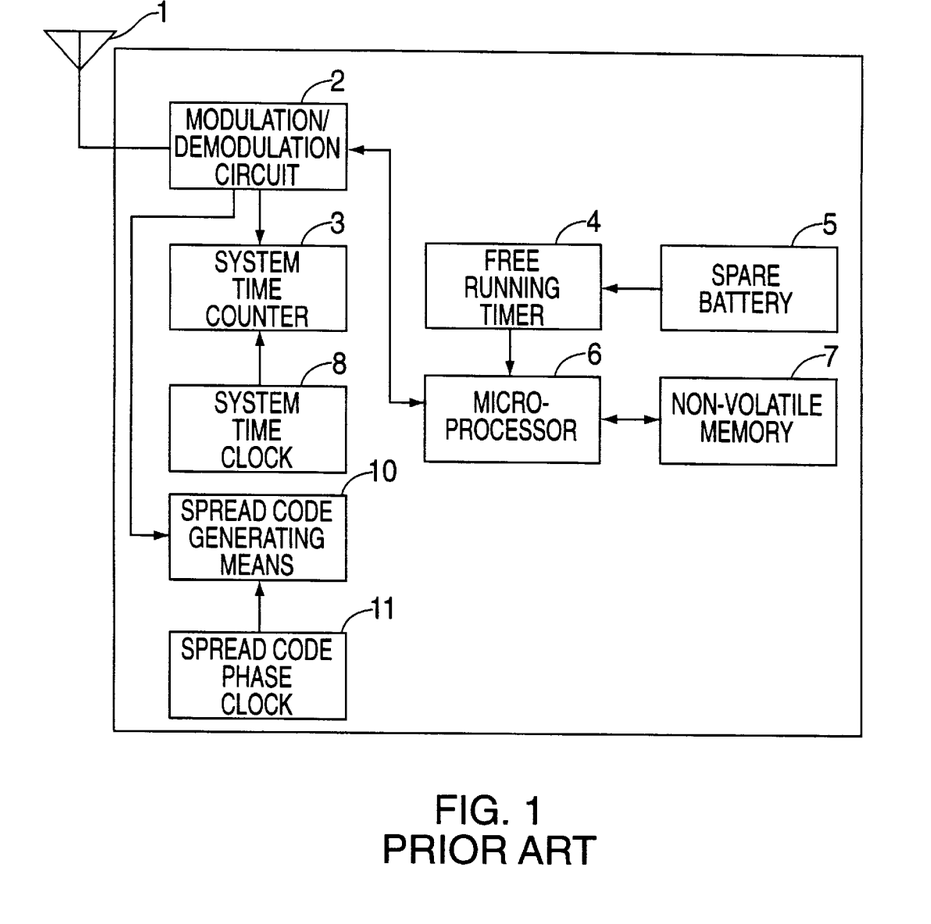
FIG. 1 is a block and schematic diagram of a prior art digital mobile telephone.

An existing spread spectrum digital mobile telephone will now be described, with reference to FIG. 1, to illustrate the problem overcome by the present invention. In FIG. 1, antenna 1 is used to receive and transmit signals between the mobile telephone and one or more base stations. Modulation/demodulation circuit 2 is used to demodulate a received signal from a base station and to provide a regenerated data signal therefrom. Modulation/demodulation circuit 2 is also used to modulate a data signal for transmission to a base station. System time counter 3 is used to acquire and maintain, from the regenerated data signal, a local system time count to permit synchronization of the mobile telephone with a universal system time count used by the mobile communication system. The system time count is used for timing certain processes, e.g., requests for system access to originate a call through the mobile communication system, and certain operations required to hand over a communication in progress from one base station to another when the mobile station moves between base station transmission zones. System time clock 8 is used to provide a clock signal to operate system time counter 3 for maintaining the locally generated system time count in synchronization with the universal system time.

Spread code generating means 10 is used to acquire initial spread code phase synchronizing information from the regenerated data signal, and to locally generate a spread code in phase synchronization with the spread code phases of received transmissions. The locally generated spread code is output to modulation/demodulation circuit 2 for use in modulating and demodulating transmissions from one or more base stations. The spread code phase clock 11 is used to generate a clock signal to operate spread code generating means 10.

The conventional prior art digital mobile telephone also includes a free running timer 4 for independently maintaining an absolute time count apart from the universal system time count used in the mobile communication system. Spare battery 5 powers the free running timer 4. Microprocessor 6 receives user input commands and generates communication control information for originating and receiving communications. Non-volatile memory 7 stores information such as the identification number of the mobile telephone and subscriber telephone numbers for speed-dialing purposes.

The operation of the conventional prior art mobile telephone will now be described. Upon energizing the mobile telephone through a main power source switch (not shown), a transmission signal from a base station of the mobile communication system is detected at antenna 1. The detected transmission signals are demodulated by modulation/demodulation circuit 2, and used by the spread code generating means 10 to generate a spread code at the same phases as those of the transmission signals. One or more transmission signals from the transmitting base station are used by the mobile telephone to establish an initial system time for initializing system time counter 3. The system time counter 3 is initialized at the same time that the mobile telephone unit acquires a spread code phase to initialize the spread code generating means 10.

From the foregoing described operations of the conventional prior art mobile telephone, it is apparent that in order to maintain the locally generated system time count of system time counter 3 in synchronization with the universal system time, the system time clock 8 must be kept operational and in synchronization with the universal system time. In the event that the system time clock 8 is temporarily disabled, the locally generated system time count and spread code will fall out of synchronization and out of phase with the universal system time and the spread code phase used by the transmitting base station. There being no recovery mechanism in the conventional prior art mobile telephone for handling such event, any communication in progress cannot be recovered, even if sufficient power for operating the mobile telephone is restored again quickly.

In the description of the invention to follow, the system time clock 8 is described as becoming temporarily nonoperational or "disabled", when the main power source voltage of the mobile telephone falls below operational level. However, the skilled person in the art will understand the applicability of the specifically disclosed embodiments of the present invention for reestablishing mobile telephone operation following other types of malfunctions which temporarily disable the operation of system time counter 3 or spread code generating means 10.

Accordingly, it is an object of the present invention to provide a mobile telephone unit which maintains a communication in progress despite an event which causes a system time counter or a spread code generating means of the mobile telephone unit to be temporarily non-operational.

Another object of the present invention is to provide a system and method in a mobile telephone for recovering, after a temporary interruption of operation, a system time count and a spread code phase used to synchronize mobile telephone operations with the mobile communication system.

SUMMARY OF THE INVENTION

These and other objects are provided by the mobile telephone and method of the present invention. The mobile telephone includes non-volatile storage for storing dynamic system operating information including a system time count and spread code phase synchronizing information just prior to the occurrence of a main power source failure which disables operation of the mobile telephone. Preferably, the non-volatile storage is also used to store static system operating information, including control channel frequency information and other information for system operation such as channel allocation information.

The mobile telephone of the present invention further includes a high speed system clock for rapidly cycling the system time counter based on a calculation of the duration of the power source failure, to thereby permit the mobile telephone to resynchronize with the mobile communication system. A high speed spread code phase clock is also provided to rapidly cycle the spread code generating means based on the calculated duration of the main power source failure.

In the present invention, these results are achieved by storing the dynamic information, including the free running timer count, the system timer count and the spread code phase synchronizing information. The duration of a power failure is calculated by determining the difference between the stored free running timer count and the free running timer count at the time that power is restored. The calculated power failure duration is used to determine a rapid cycling time for rapidly cycling the system time counter with a high speed system time clock after reloading the system timer counter with the stored system time count. The calculated power failure duration is also used to rapidly cycle the spread code phase generating means to a spread code phase after reloading the stored spread code phase synchronizing information. In this manner, after a temporary power failure or other temporary interruption of operation during a communication in progress, the mobile telephone rapidly recovers synchronization with the universal system time and the spread code phase of the transmitting base station, such that the communication in progress is fully restored without requiring the communication to be reestablished anew.

DETAILED DESCRIPTION OF THE PREFERRED EMBODIMENTS

In the following, specific examples of the mobile telephone and method of the present invention will be described, with reference to the above described drawings.

Figure 2:
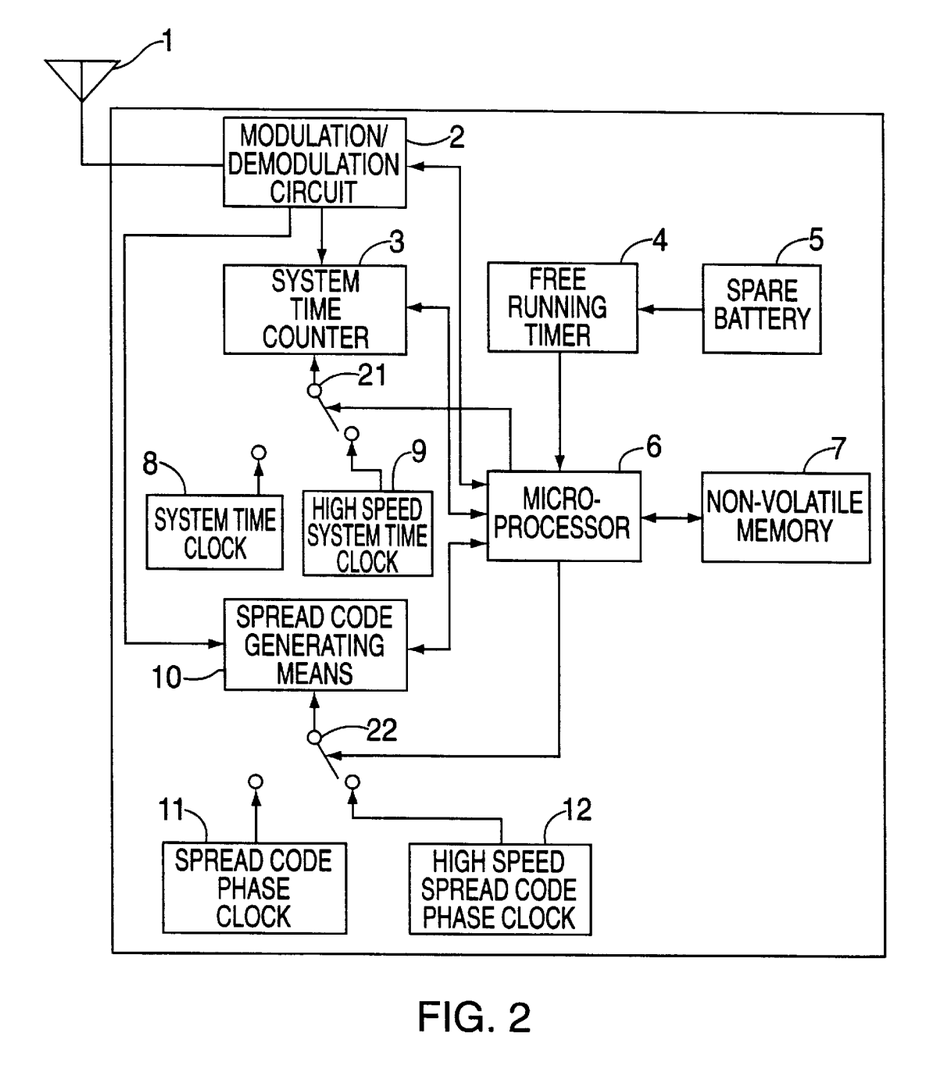
FIG. 2 is a block and schematic diagram of a digital mobile telephone constructed in accordance with a first embodiment of the present invention.

FIG. 2 is a block and schematic diagram of a mobile telephone constructed in accordance with a first embodiment of the present invention for providing digital mobile communications according to the CDMA Standard adopted for North America. As shown in FIG. 2, reference numerals 1 through 8, and 10 through 11 indicate the same features as those shown and described with reference to the conventional prior art mobile telephone of FIG. 1. Therefore, those features need not be described in any further detail here. The mobile telephone of FIG. 2 includes high speed system time clock 9 used to generate a high speed clock signal for operating system time counter 3 at high speed. The mobile telephone of FIG. 2 further includes high speed spread code phase clock 12 used to generate a clock signal for operating spread code generating means 10 at high speed.

Figure 3:
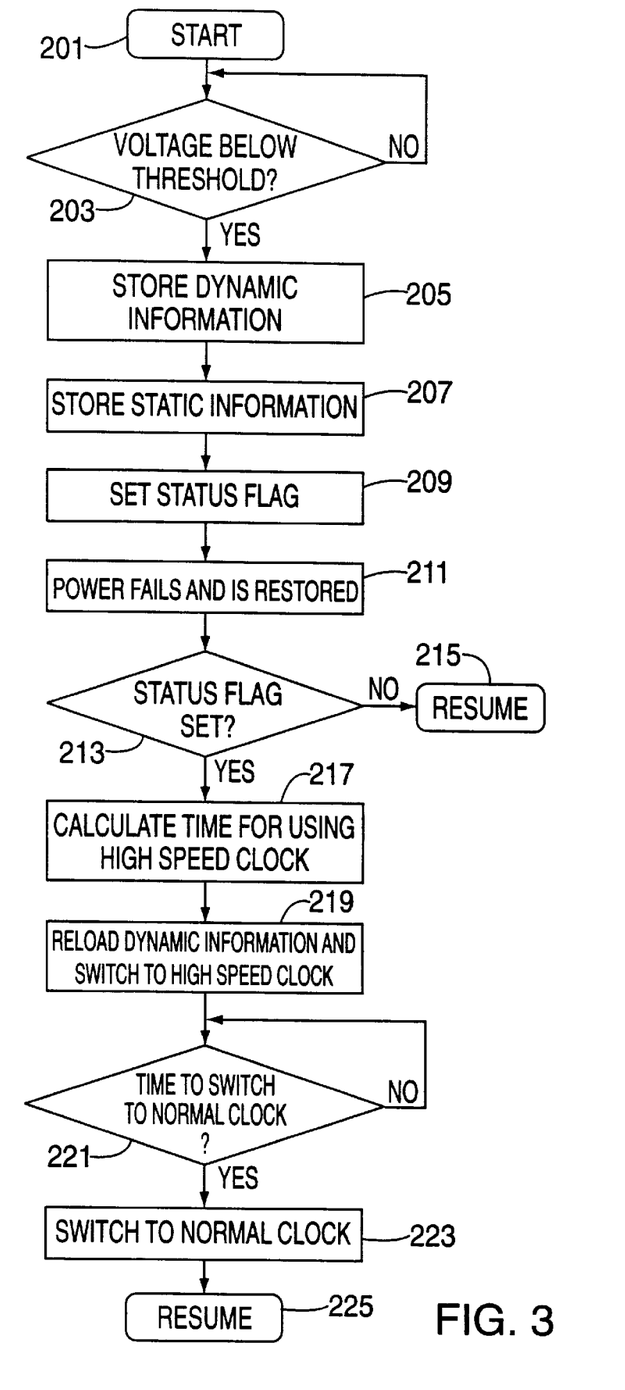
FIG. 3 illustrates operations performed by the digital mobile telephone shown in FIG. 2.

The operations of the digital mobile telephone of FIG. 2 following a temporary disabling loss of power from a main power source will now be described, with reference to the flowchart of operations of FIG. 3. As shown in FIG. 3, once the mobile telephone begins operating, in step 201, a check is made by the microprocessor to determine if the main power source voltage lies below a predetermined threshold value (step 203).

If the main power source voltage does not lie below the threshold, as shown by the "No" decision arrow, the operation of the mobile telephone continues as normal, and checks are made again at predetermined intervals thereafter, both during, and between communications in progress, to determine if the main power source voltage has fallen below the predetermined threshold value.

If the main power source voltage has fallen below the predetermined threshold value, the microprocessor 6 stores the current dynamic communication information, which includes the current system time count of the system time counter 3, current spread code phase synchronizing information output by spread code generating means 10, and the current absolute time count of the free-running timer 4 (step 205). In step 207, the microprocessor 6 also stores, in the non-volatile memory 7, the current static communication information (e.g., channel number and control channel information) which are acquired by the mobile telephone in operation. The microprocessor 6 also sets a status flag, in step 209, to indicate that the main power source voltage has fallen below threshold.

Next, the occurrence of a main power source failure and its subsequent restoration is indicated in FIG. 3 by reference numeral 211. Thereafter, in step 213, whenever the voltage of the main power source is brought up to an operational level, the microprocessor 6 checks to determine if the status flag for the mobile telephone has been set. If the status flag has not been set, the microprocessor determines that the mobile telephone has been powered on from an initial switched off condition, and commences ordinary start-up operations following the power-on, thus resuming operation (step 215) from the beginning, as in step 201.

However, if after power to the mobile telephone is restored, the microprocessor determines that the status flag has been set (in step 213), the microprocessor 6 determines that an abnormal power interruption has occurred. The microprocessor then performs operations to restore mobile telephone operation, which includes restoring any communication which is in progress. In step 217, the microprocessor 6 calculates a time duration for switching the operations of the system time counter 3 and the spread code phase generating means 10 to the high speed clocks 9 and 12. The microprocessor determines that time duration by determining the difference between the absolute time count of the free-running timer 4 stored just prior to the power failure to the current absolute time count of the free running timer 4. Using the calculated duration of power interruption, the microprocessor 6 calculates, in step 217, the rapid cycling time duration to rapidly cycle the system time counter 3 and the spread code phase generating means 10 using the high speed clocks 9 and 12. The microprocessor 6 calculates the rapid cycling time duration in accordance with the relative differences between the speed of the high speed clocks 9 and 12 and the speeds of the system time clock 8 and the spread code phase clock 11, respectively.

Finally, using the calculated rapid cycling time duration, the microprocessor 6 calculates a restoration time count for the free-running timer 4, which signifies the time at which operation of the system time counter 3 and the spread code phase generating means 10 should be switched back to the normal system time clock 8 and spread code phase clock 11, respectively. In step 219, the stored system time count and spread code phase synchronization information are reloaded into the system time counter 3 and spread code generating means 10 and the microprocessor causes the input clock signals of the system time counter 3 and the spread code generating means 10 to be switched to the high speed system clock 9 and high speed spread code phase clock 12, respectively.

While the system time counter 3 and the spread code generating means 10 have been switched over to the high speed clocks 9 and 12, the microprocessor checks the time count of the free running timer 4 to determine if the calculated restoration time count for switching operations back to the clocks used in normal operation has been reached (step 221). If the restoration time count has not been reached, the microprocessor continues to wait until such time, as indicated by the "No" arrow at step 221. However, if the calculated time has been reached, the microprocessor causes the clock inputs of the system time counter 3 and the spread code phase generating means 10 to be switched back to the system time clock 8 and the spread code phase clock 11 which are used in normal operation. Normal operation of the mobile telephone then resumes (step 225), which includes the resumption of a communication in progress, so long as a subscriber on the distant receiving end of the communication has not acted to terminate the communication, or the mobile communication system has not otherwise terminated the communication e.g., by timing out after the temporary interruption in communication signal.

Figure 4:
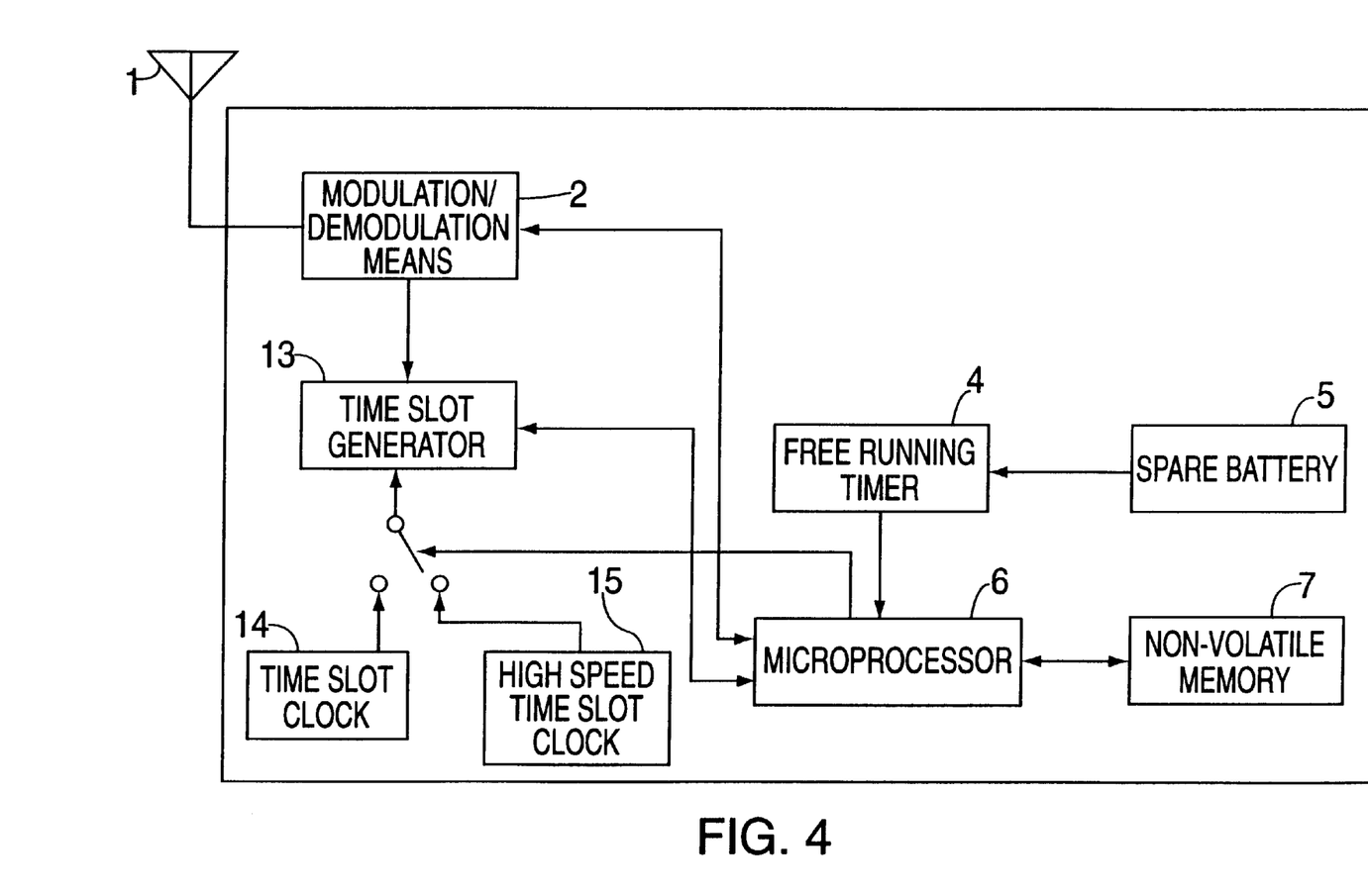
FIG. 4 is a block and schematic diagram of a digital mobile telephone constructed in accordance with a second embodiment of the present invention.

FIG. 4 is a block and schematic diagram of a digital mobile telephone constructed according to a further embodiment of the present invention for use in a "frequency hopping" spread spectrum transmission system, such as has been implemented in several European countries. In FIG. 4, time slot generator 13 is used to generate and maintain current information representing a frequency hopping pattern including time slots for transmission at particular frequencies. Time slot clock 14 is used to provide a clock signal input to time slot generator 13 for generating the current time slot information. High speed time slot clock 15 provides a high speed clock signal to time slot generator 13 for updating the current frequency hopping pattern and time slot following the restoration of operation after a power interruption or other temporary interruption of operation.

In this embodiment of the present invention, in a similar manner to the operations of the CDMA digital mobile telephone shown and described in the foregoing with reference to FIGS. 2–3, the current dynamic information including the current time slot synchronizing information output by the time slot generator 13, and the absolute time count output by the free running timer 4, are stored in the non-volatile memory when the voltage of the main power source falls below a predetermined threshold level (step 205). When the main power source voltage is restored after an abnormal interruption, the microprocessor calculates a rapid cycling time duration for switching the clock input of the time slot generator 13 to the clock signal provided by the high speed time slot clock 15 (step 217). The rapid cycling time duration is used by the microprocessor 6 to calculate time count of the free running timer 4 at which the clock signal input to the time slot generator 13 is to be switched back to the time slot clock 14 used in normal operation.

In a similar manner as performed by the digital mobile telephone of the first embodiment of the present invention, the microprocessor 6 reloads the time slot generator 13 with the stored time slot synchronizing information and switches the clock signal input of the time slot generator 13 to the high speed clock 15 (step 219). The rapid cycling continues until the microprocessor determines if the restoration time count of the free running timer 4 has been reached (step 221).

When the restoration time count has been reached, the microprocessor 6 switches the clock signal input of the time slot generator 13 back to the time slot clock 14 used in normal operation (step 223), and the mobile telephone resumes normal operations (step 225). Since the time slot, i.e. frequency hopping pattern information required for resuming a communication in progress is restored after the restoration of power and mobile telephone operations, any communication which is currently in progress from the mobile telephone is restored, provided that the subscriber at the distant end has not terminated the communication or the mobile communication system has not otherwise terminated the communication such as by timing out.

While the invention has been described in detail herein in accordance with certain preferred embodiments thereof, many modifications and changes therein may be effected by those skilled in the art.

Accordingly, it is intended by the appended claims to cover all such modifications and changes as fall within the true spirit and scope of the invention.

What is claimed is:

1. In a mobile telephone having synchronizing means for maintaining synchronization with a mobile communication system, a system for restoring synchronization between said mobile telephone and said mobile communication system after a temporary interruption of operation, comprising:
   means for calculating the duration of said temporary interruption; and
   means responsive to said calculated duration for restoring synchronization of said synchronizing means.

2. The system of claim 1 wherein said means for calculating includes:
   means for generating a time count during said temporary interruption; and
   computing means for acquiring and storing an onset time count at an onset of said temporary interruption, determining an end time count at an end of said temporary interruption, and determining said duration from said onset time count and said end time count.

3. The system of claim 1 wherein said means for restoring synchronization includes means for acquiring and storing synchronizing information for said synchronizing means prior to said temporary interruption.

4. The system of claim 3 wherein said synchronizing means is responsive in normal operation to a normal cycling rate and wherein said means for restoring synchronization includes:
   means for transferring said stored synchronizing information to said synchronizing means; and
   means for cycling said synchronizing means at a higher rate than said normal cycling rate.

5. The system of claim 1 wherein said temporary interruption of operation comprises an interruption of power from a main power source of said mobile telephone.

6. In a spread spectrum digital mobile telephone having spread code generating means for locally generating a spread code at a phase used for communication by said transmitting station, and modulation/demodulation means for modulating and demodulating communication signals to and from said transmitting station using said locally generated spread code at said phase, a system for recovering an ongoing communication after a temporary interruption of power to said mobile telephone, comprising:
   means for calculating the duration of said temporary interruption;
   phase restoring means responsive to said calculated duration for restoring the output of said spread code generating means to said phase, such that said modulation/demodulation means thereafter modulates and demodulates said communication signals at said phase.

7. The system of claim 6 wherein said mobile telephone further includes system timer means for maintaining synchronization with a transmitting station of said mobile communication system, and said system further includes means for restoring synchronization of said system timer means based on said calculated duration.

8. The system of claim 6 wherein said means for calculating includes
   means for generating a time count during said temporary interruption; and
   computing means for acquiring and storing an onset time count at an onset of said temporary interruption, determining an end time count at an end of said temporary interruption, and determining said duration from said onset time count and said end time count.

9. The system of claim 6 wherein said spread code generator means is responsive in normal operation to a normal cycling rate and wherein said phase restoring means further includes:
   means for acquiring and storing synchronizing information for said spread code generating means prior to said temporary interruption;
   means for transferring said stored synchronizing information to said spread code generating means after said temporary interruption; and
   means for cycling said spread code generating means at a higher rate than said normal cycling rate such that the output of said spread code generating means is restored to said phase after said temporary interruption.

10. The system of claim 7 wherein said system timer means is responsive in normal operation to a normal cycling rate and wherein said means for restoring synchronization further includes:
   means for acquiring and storing synchronizing information for said system timer means prior to said temporary interruption;
   means for transferring said stored synchronizing information to said system timer means after said temporary interruption; and
   means for cycling said system timer means at a higher rate than said normal cycling rate such that the output of said system timer means is restored to synchronization with said mobile communication system after said temporary interruption.

11. In a spread spectrum digital mobile telephone having time slot generator means for locally generating a time slot pattern in synchronization with a transmitting station time slot pattern used by a transmitting station of a mobile communication system, and modulation/demodulation means for modulating and demodulating communication signals to and from said transmitting station using said locally generated time slot pattern, a system for recovering an ongoing communication after a temporary interruption of power, comprising:

means for calculating the duration of said temporary interruption; and means responsive to said calculated duration for restoring the output of said time slot generator means in synchronization with said transmitting station time slot pattern, such that said modulation/demodulation means thereafter modulates and demodulates said communication signals in synchronization with said transmitting station time slot pattern, thereby recovering said ongoing communication.

12. The system of claim 11 wherein said means for calculating includes means for generating a time count during said temporary interruption; and computing means for acquiring and storing an onset time count at an onset of said temporary interruption, determining an end time count at an end of said temporary interruption, and determining said duration from said onset time count and said end time count.

13. The system of claim 11 wherein said time slot generator means is responsive in normal operation to a normal cycling rate and wherein said means for restoring includes:

means for acquiring and storing synchronizing information for said time slot generator means prior to said temporary interruption;

means for transferring said stored synchronizing information to said time slot generator means after said temporary interruption; and means for cycling said time slot generator means at a higher rate than said normal cycling rate, such that the output of said time slot generator means is restored to synchronization with said mobile communication system after said temporary interruption.

14. In a mobile telephone having synchronizing means for maintaining synchronization with a mobile communication system, a method for restoring synchronization between said mobile telephone and said mobile communication system after a temporary interruption of operation, comprising the steps of:

calculating the duration of said temporary interruption; and restoring synchronization of said synchronizing means based on said calculated duration.

15. The method of claim 14 wherein said step of calculating includes:

generating a time count during said temporary interruption;

detecting an onset of said temporary interruption;

acquiring and storing an onset time count at said onset;

determining an end time count at an end of said temporary interruption; and determining said duration from said onset time count and said end time count.

16. The method of claim 14 wherein said step of restoring synchronization includes acquiring and storing synchronizing information for said synchronizing means prior to said temporary interruption.

17. The method of claim 16 wherein said synchronizing means is responsive in normal operation to a normal cycling rate and wherein said step of restoring synchronization further includes transferring said stored synchronizing information to said synchronizing means; and cycling said synchronizing means at a higher rate than said normal cycling rate.

18. The method of claim 14 wherein said temporary interruption of operation comprises an interruption of power from a main power source of said mobile telephone.

19. In a spread spectrum digital mobile telephone having spread code generating means for locally generating a spread code at a phase used for communication by said transmitting station, and modulation/demodulation means for modulating and demodulating communication signals to and from said transmitting station using said locally generated spread code at said phase, a method for recovering an ongoing communication after a temporary interruption of power to said mobile telephone, comprising the steps of:

calculating the duration of said temporary interruption;

restoring the output of said spread code generating means to said phase based on said calculated duration, such that said modulation/demodulation means thereafter modulates and demodulates said communication signals at said phase.

20. The method of claim 19 wherein said mobile telephone further includes system timer means for maintaining synchronization with a transmitting station of said mobile communication system, and said method further includes the step of restoring synchronization of said system timer means based on said calculated duration.

21. The method of claim 19 wherein said step of calculating includes:

generating a time count during said temporary interruption;

detecting an onset of said temporary interruption;

acquiring and storing an onset time count at said onset;

determining an end time count at an end of said temporary interruption; and determining said duration from said onset time count and said end time count.

22. The method of claim 19 wherein said spread code generator means is responsive in normal operation to a normal cycling rate and wherein said step of restoring said output includes:

acquiring and storing synchronizing information for said spread code generating means prior to said temporary interruption;

transferring said stored synchronizing information to said spread code generating means after said temporary interruption; and cycling said spread code generating means at a higher rate than said normal cycling rate such that the output of said spread code generating means is restored to said phase after said temporary interruption.

23. The method of claim 20 wherein said system timer means is responsive in normal operation to a normal cycling rate and wherein said step of restoring synchronization includes:

acquiring and storing synchronizing information for said system timer means prior to said temporary interruption;

transferring said stored synchronizing information to said system timer means after said temporary interruption; and cycling said system timer means at a higher rate than said normal cycling rate, such that the output of said system timer means is restored to synchronization with said mobile communication system after said temporary interruption.

24. In a spread spectrum digital mobile telephone having time slot generator means for locally generating a time slot pattern in synchronization with a transmitting station time slot pattern used by a transmitting station of a mobile communication system, and modulation/demodulation means for modulating and demodulating communication signals to and from said transmitting station using said locally generated time slot pattern, a method for recovering an ongoing communication after a temporary interruption of power, comprising the steps of:

calculating the duration of said temporary interruption; and restoring the output of said time slot generator means in synchronization with said transmitting station time slot pattern based on said calculated duration, such that said modulation/demodulation means thereafter modulates and demodulates said communication signals in synchronization with said transmitting station time slot pattern, thereby recovering said ongoing communication.

25. The method of claim 24 wherein said step of calculating includes:

generating a time count during said temporary interruption;

detecting an onset of said temporary interruption;

acquiring and storing an onset time count at said onset;

determining an end time count at an end of said temporary interruption; and determining said duration from said onset time count and said end time count.

26. The method of claim 24 wherein said time slot generator means is responsive in normal operation to a normal cycling rate and wherein said step of restoring said output includes:

acquiring and storing synchronizing information for said time slot generator means prior to said temporary interruption;

transferring said stored synchronizing information to said time slot generator means after said temporary interruption; and cycling said time slot generator means at a higher rate than said normal cycling rate, such that the output of said time slot generator means is restored to synchronization with said mobile communication system after said temporary interruption.

* * * * *